Figure 5:
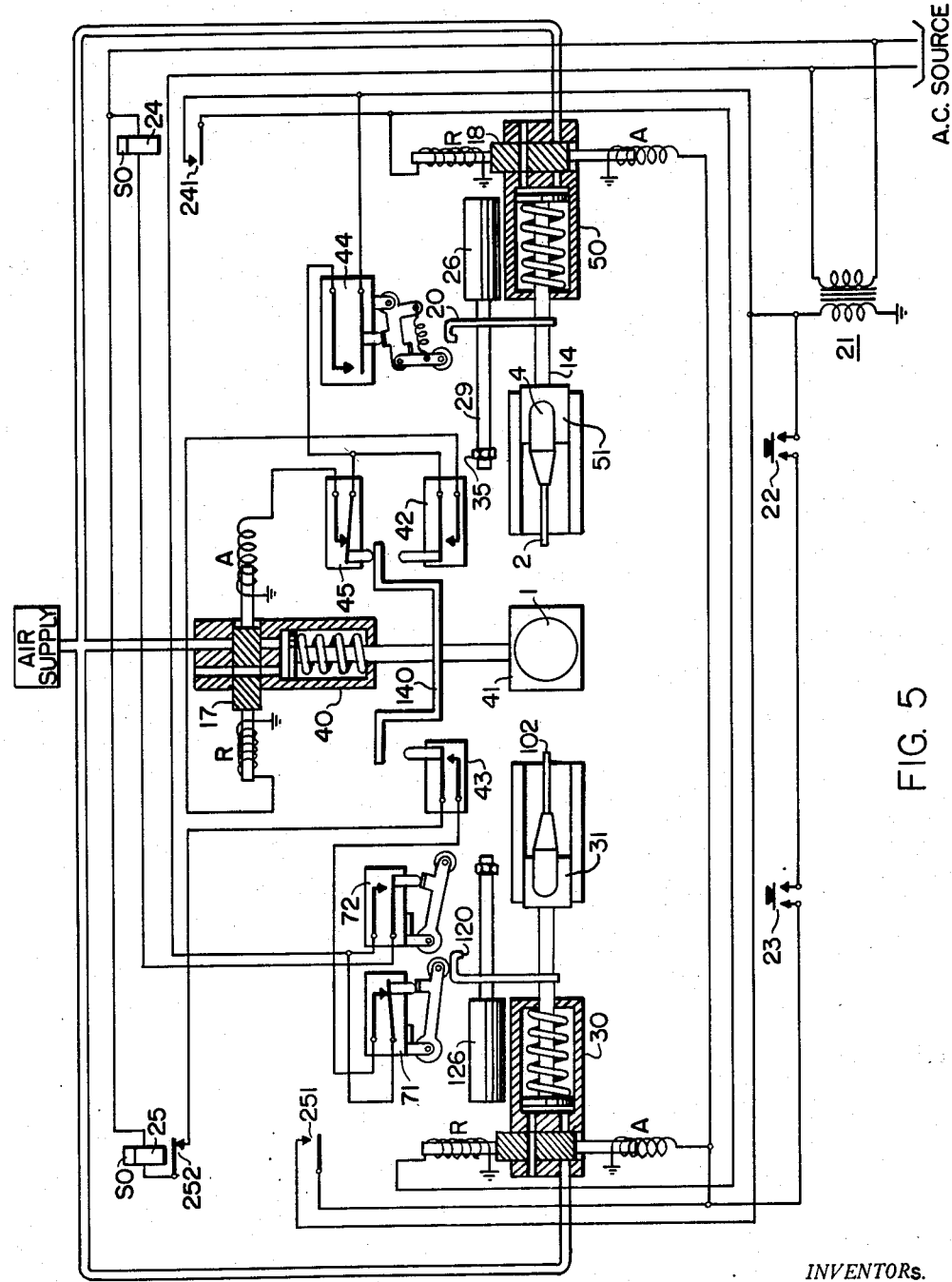

Dec. 22, 1953     J. R. TINSMAN ET AL     2,663,334
AUTOMATIC SCREW DRIVING MACHINE
Filed Sept. 8, 1951     3 Sheets-Sheet 1
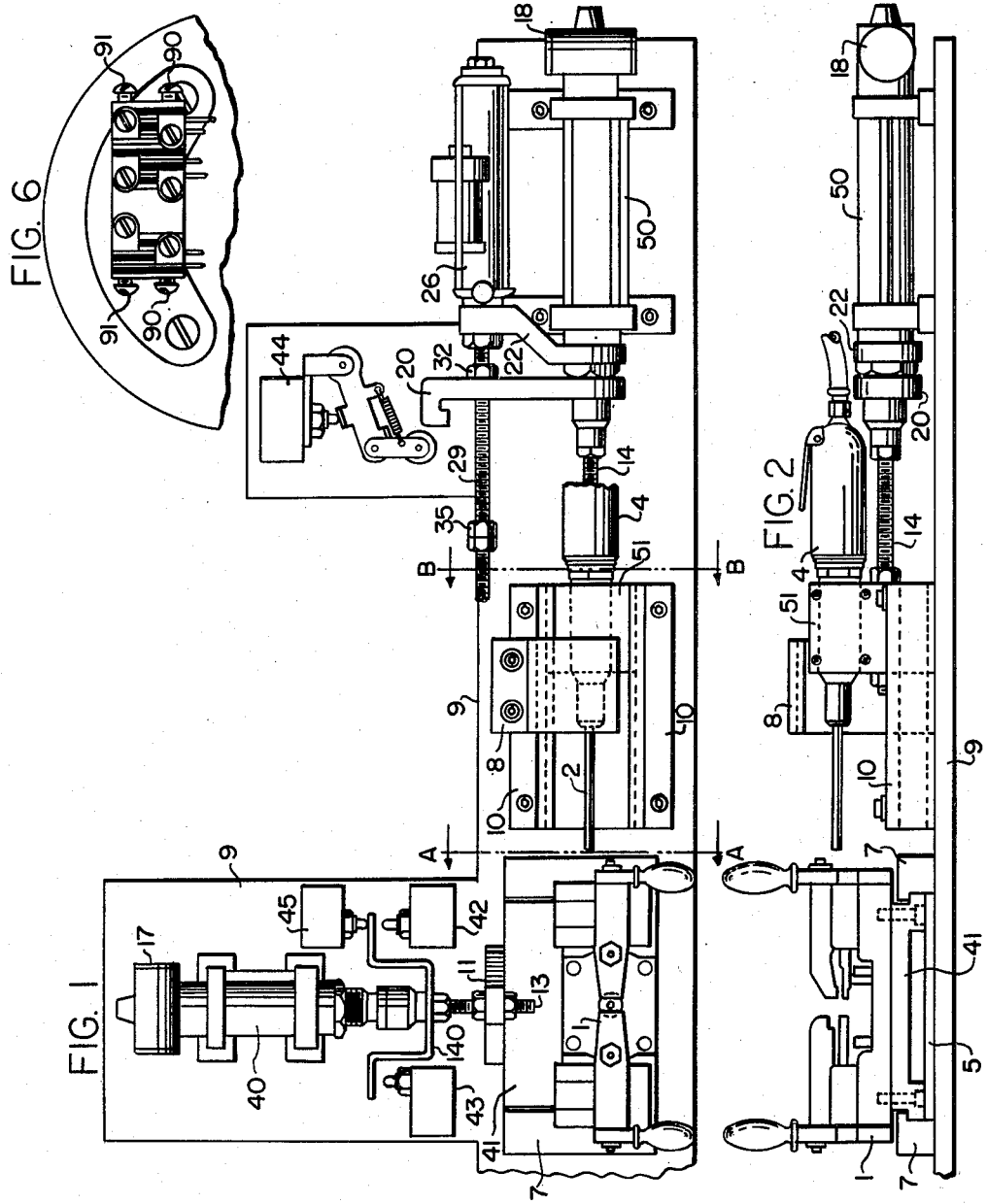
INVENTORS.
JACK R. TINSMAN
RICHARD J. NOVY
RICHARD O. PENCE
BY
ATTORNEY

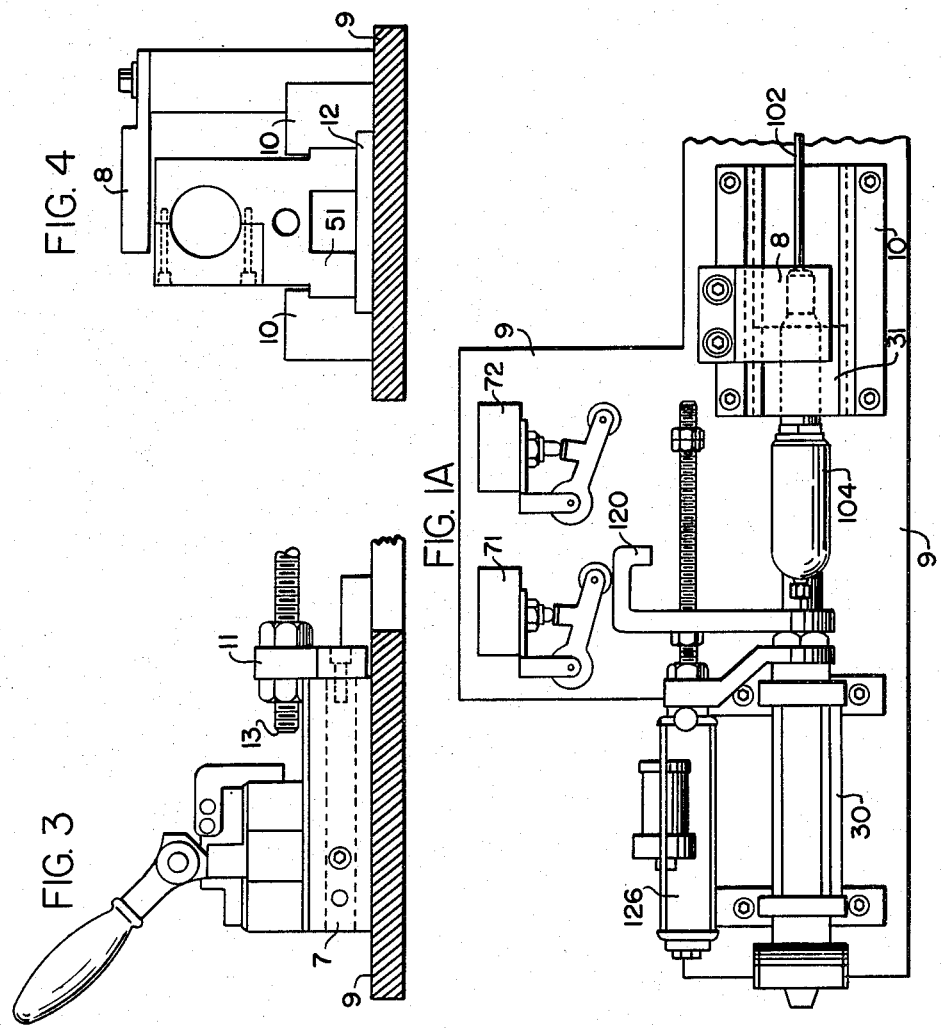

INVENTORs.
JACK R. TINSMAN
RICHARD J. NOVY
RICHARD O. PENCE
BY
ATTORNEY

Patented Dec. 22, 1953

2,663,334

UNITED STATES PATENT OFFICE 2,663,334

AUTOMATIC SCREW DRIVING MACHINE

Jack R. Tinsman, Park Ridge, Richard J. Novy, Chicago, and Richard O. Pence, Wilmette, Ill., assignors to Automatic Electric Laboratories, Inc., Chicago, Ill., a corporation of Delaware Application September 8, 1951, Serial No. 245,714

7 Claims. (Cl. 144—32)

This invention relates to automatic power operated machines in general and more particularly to power operated screwdrivers.

In assembling telephone instrument dials a plurality of springs are mounted in an arrangement known in the art as a spring pile-up. These springs must be screwed tightly together to prevent loosening of the pile-up which would disturb the operation of the spring contacts.

Heretofore, the assembly has been manually performed in its entirety. The dial has been held in a fixture while the operator drove the screws with an ordinary screwdriver. Since there are four screws in the dial, this method has required four separate manual operations and the security of the pile-ups has depended entirely upon the skill of the operator. Although the need has arisen with regard to the assembly of telephone instrument dials, the machine is adaptable for use with any product upon which similar screw driving operations must be performed.

One object of this invention is to provide a screw driving machine capable of continuous production line operation and requiring a minimum of manual control.

Another object is to increase productive output over the manual method of assembly now in use.

A further object of the invention is to reduce the number of manual operations required, thereby requiring a lesser degree of skill of the operator.

A still further object of the invention is to provide a means for fastening the spring pile-up with a uniform tension. This is accomplished by providing the screw driving tool with a clutch which will slip when the proper tension is reached.

A feature of this invention is the automatic slidable advancing of rotary tools into an operating position.

Another feature is the automatic indexing of the workpiece carriage into an off-normal position.

Another feature is the reapplication of the rotary tools to the workpiece in its off-normal position.

A still further feature is the use of limit switches to control automatically the sequence of operation of the machine elements.

Another feature is a means for controlling automatically the time that the screwdrivers are engaged with the workpiece.

Another feature is the arrangement of the manual start buttons in a position which requires both hands of the operator to be free of the machine before the operation commences.

The preferred embodiment of the invention is shown in the drawings of which Fig. 1 is a partial plan view of the machine and shows the arrangement of the workpiece indexer and one of the driving tools. Fig. 1A shows the portion of the machine that has been omitted in Fig. 1. The driving tool on the right side of the machine shown in Fig. 1 and the driving tool on the left side of the machine shown in Fig. 1A are alike except for the switches which they operate. Fig. 2 is a front view of the partial plan view of Fig. 1. A complete front view of the machine is not shown, because differences and similarities between the right side and the left side are made clear in Fig. 1, Fig. 1A and Fig. 5. Fig. 3 is a sectional view along line A—A of Fig. 1 and shows the connection of the indexing mechanism with the fixture carriage. Fig. 4 is a sectional view along line B—B of Fig. 1 and shows the sliding tool carriage and its guide arrangement. Fig. 5 is a schematic diagram showing the mechanical and electrical operation of the machine. Fig. 6 is a plan view of a portion of the dial showing the spring pile-ups and the screws before they are tightened by the machine.

Briefly, the machine operates as follows: The operator places the workpiece in a fixture which is mounted on a sliding carriage connected to an indexing mechanism. The operator presses a start control and two opposing power operated screwdrivers mounted on sliding carriages are advanced toward the workpiece by actuating cylinders. Limit switches are variously placed to provide automatic control of the machine for the remainder of the operation. The power tools advance to the work and are held in contact therewith for a time controlled by a limit switch and a time delay relay. After this holding period the driving tools are retracted. When the tools have nearly reached their retracted position another limit switch is operated which causes the indexing mechanism to index the work a predetermined distance. As the indexing mechanism advances other limit switches are operated to cause a second advance of the driving tools. The tools retract after a holding period and, in doing so, operate switches which cause the retraction of the indexing mechanism. This returns the workpiece to its original position and stops the machine. A more detailed description follows:

A workpiece (Fig. 6) is placed in fixture 1 (Fig. 1) and secured so that screws to be tightened in the first operation are aligned coaxially with driving tool 2 and an opposing driving tool 102 which is exactly like tool 2.

Tools 2 and 102 are secured in standard power operated screwdrivers 4 and 104 of a type well known in the art. The screwdrivers described here are the pneumatic motor driven type but other types can be used. Screwdrivers 4 and 104 are mounted in carriages 51 and 31 which are restrained by guides 8 and right and left guides 10 which are mounted on bedplate 9.

Fixture 1 is mounted on carriage 41. Carriage 41 is restrained by guide 7 which, like guides 10, is mounted on bedplate 9. Fastened to carriage 41 is an upright 11 to which a shaft 13 is secured. From screwdriver shaft 2 shaft 13 extends at an angle of 90° into an actuating cylinder 40 of the electrically controlled pneumatic type well known in the art and which is also mounted on bedplate 9. It can be seen in Fig. 3 that movement of shaft 13 to the left will advance fixture 1 and carriage 41. Guide 7 contains carriage 41, and guide 5 which is fastened to bedplate 9 provides the surface upon which the carriage travels (Fig. 2).

The tool carriage 51 is shown resting upon its slide 12 (Fig. 4) and contained by side guides 10 and top guide 3 all of which guides are secured to bedplate 9. Attached to carriage 51 is a shaft 14 which extends into cylinder 50 which is similar to but larger than cylinder 40. Cylinder 50 advances the tool by means of shaft 14 and carriage 51 to the workpiece secured in fixture 1. A yoke 20 (Fig. 1) is secured to shaft 14 and is slidably connected to shaft 29 to which stop nuts 35 and 32 are fastened. Movement of shaft 14 carries the yoke into engagement with nut 35 thereupon attempting movement of shaft 29 in conjunction with shaft 14. Shaft 29, however, extends into a hydro-check mechanism 26 which will resist the attempted travel of shaft 29 in a well known manner. Cylinders 40 and 50 are controlled by solenoid valves 17 and 18, respectively. The air supply for the pneumatic cylinders is provided in the usual well known manner not shown. Cylinder 30 and carriage 31 correspond to cylinder 50 and carriage 51 in the tool described. The two tools perform identical driving operations but differ in their control functions.

Fig. 5 is a schematic diagram of the mechanical and electrical control system of the invention. The machine can be made to operate either on alternating or direct current and the machine may be adapted to operate at any standard voltage. The preferred embodiment has a source of 110 volts potential connected to the primary winding of a transformer 21 which has an 8 volt secondary winding one side of which is connected to ground and the other through momentary contact push-button 22 through momentary contact push-button 23 to the advance coils A of the solenoid valves of cylinders 30 and 50 which coils are grounded at one end. When push-buttons 22 and 23 are pressed current flows from the secondary winding of transformer 21, through push-buttons 22 and 23, through the advance coils A of cylinders 30 and 50, which are connected in parallel, to ground, thereby energizing the coils and opening the solenoid valves of the cylinders causing air pressure to advance the driving tools to the workpiece. The ungrounded side of the 8 volt winding is also connected through limit switches 44 and 45 to the advance coil A of cylinder 40 one side of which coil is grounded or through switches 44 and 42 to the retracting coil of cylinder 40 one side of which coil is also grounded.

Across the primary winding of the power source are connected two timing control devices 24 and 25. In this embodiment these are "Agastat" electro-pneumatic timed delay relays. They control the retraction and second advance of the tool carriages and are themselves controlled by other limit switches which are mechanically operated by the indexer carriage 41 and the tool carriages 31 and 51.

The machine operates as follows: By simultaneously closing momentary contact push-buttons 22 and 23 a circuit is completed from the secondary winding of transformer 21 through contacts 22 and 23, through the advance coils A of the solenoid valves of cylinders 30 and 50 to ground. Current is induced to flow in this circuit by transformer action. The advance solenoid valves of cylinders 30 and 50 open, actuating the cylinders which cause tool carriages 31 and 51 to move inward toward the workpiece. As carriage 31 and yoke 120 advance, limit switch 71 is opened and as the advance continues switch 72 is closed by yoke 120, completing a circuit from the 110 volt source through contact 72 to timed delay relay 24. Relay 24 is slow to operate and the tool carriages continue to advance retarded by hydrochecks 26 and 126. After yoke 20 reaches stop nut 35 the travel of shaft 14 and tool 4 is slight and it is during this slight travel that the screws 90 are driven. If the screws are completely driven before the end of the time delay spring-loaded clutches (not shown) in tools 4 and 104 prevent further driving in a well known manner. These clutches are responsible for the uniform tension applied to all screws driven by the machine.

After the screws have been driven relay 24 closes contact 241 which completes a circuit from the secondary winding of transformer 21 through contact 241 of timed delay relay 24 through the retract coils R of the solenoid valves of cylinders 30 and 50 to ground, causing tool carriages 31 and 51 to return to their original positions. As they return, yoke 120 opens switch 72, causing relay 24 to deenergize which, in turn, opens contact 241. As carriage 31 retracts, yoke 120 closes limit switch 71, also during the retracting operation, yoke 20 closes and then reopens limit switch 44. Switch 44 is operated only on the retract stroke of cylinder 50. Switch 45 is closed while indexer carriage 41 is in its normal position as shown and when switch 44 is momentarily closed it completes a circuit from the secondary winding of transformer 21 through limit switches 44 and 45 through the advance coil A of the solenoid valve of cylinder 40 to ground. The solenoid valve opens and cylinder 40 causes the indexer carriage 41 to advance a predetermined distance, opening switch 45 when it leaves its retracted position and closing switch 42 when it reaches its advanced position. After switch 44 closes and causes cylinder 40 to operate, switch 44 must reopen before switch 42 is closed or carriage 41 will be immediately retracted. The distance between switches 45 and 42 is short so switch 44 must be very fast to close and reopen before switch 42 is closed.

When cylinder 40 operates to advance carriage 41 holding fixture 1, it aligns two new screws 91 with tools 2 and 102. When carriage 41 reaches its extreme advanced position yoke 140 closes contacts 42 and 43. Current flows from the 110 volt source through another timed delay relay 25, through contact 252 of relay 25, switch 43, switch 71, and back to the source. Relay 25 controls the second advance of the tools but it is slow to operate, allowing the indexer time to align the second pair of screws with tools 2 and 102. After a holding period relay 25 operates, making contact 251 and breaking contact 252. Current flows from the secondary winding of the transformer through contact 251, through the advance coils A of the solenoid valves of cylinders 30 and 50 to ground, causing the cylinders to operate and advance the tool carriages. When contact 252 opens, relay 25 deenergizes, breaking contact 251 and making contact 252.

As the cylinders advance, limit switch 71 opens, and switch 72 closes, again operating timed delay relay 24. The tools drive the second pair of screws 91 and retract as before. As carriage 51 retracts this time, switch 42 is closed and switch 45 is opened. Therefore, when switch 44 closes momentarily current flows through the retract coil R of the solenoid valve of cylinder 40 instead of the advance coil A as before. Once again switch 44 must operate quickly so that it reopens before switch 45 is closed by the complete retraction of carriage 41.

When the cylinders are all in their retracted positions the machine has reached the end of its automatic operation. The operator removes the assembled dial from fixture 1 and reloads the machine. Nothing more will happen until the operator again presses the two push-buttons.

Having described the invention, what is considered new and is desired to be secured by Letters Patent follows.

What is claimed is:

1. An automatic screw driving machine including means for holding a workpiece, a plurality of power driven screwdrivers, means for advancing said screwdrivers to the workpiece, means for causing said screwdrivers to drive screws into a workpiece held in said holding means, means for retracting said screwdrivers, means for indexing said holding means and thereby aligning other screws with said screwdrivers, means for readvancing said screwdrivers to the workpiece and driving said other screws, means for retracting said screwdrivers again, and means for then retracting said holding means and stopping the machine.

2. An automatic screw driving machine including means for holding a workpiece, said workpiece containing a plurality of loosely held screws, a plurality of power driven screwdrivers, means for advancing said screwdrivers to the workpiece, means for causing said screwdrivers to drive certain of said screws into the workpiece, means for automatically retracting said screwdrivers, means for automatically indexing said holding means and thereby aligning others of said screws with said screwdrivers, means for automatically readvancing said screwdrivers to the workpiece and driving said other screws, means for automatically retracting said screwdrivers again, and means for then retracting said holding means and stopping the machine.

3. An automatic screw driving machine including means for holding a workpiece, a plurality of power driven screwdrivers each held in a sliding carriage, means for advancing said screwdrivers to a workpiece held in said holding means, said advancing means comprising electrically controlled pneumatic cylinders, means for causing said screwdrivers to drive certain screws into a workpiece held in said holding means, means for automatically retracting said screwdrivers, said retracting means also comprising said cylinders, means for automatically indexing said holding means and thereby aligning other screws in the workpiece with said screwdrivers, said indexing means being held in another sliding carriage and comprising another electrically controlled pneumatic cylinder, means for automatically readvancing said screwdrivers to the workpiece and driving said other screws, means for automatically retracting said screwdrivers again, and means for then retracting said holding means and stopping the machine.

4. An automatic screw driving machine as claimed in claim 3, having a source of potential and a plurality of micro-switches and timed delay relays, said micro-switches and relays being arranged so that when said tool carriages advance to the workpiece one of said relays will cause said tool carriages to be retracted after a short holding period and the other relay will cause said tool carriages to readvance after said indexing means has indexed said workpiece and aligned said other screws with said screwdrivers.

5. An automatic screw driving machine as claimed in claim 4 having a start control which when pressed actuates the machine and causes said tool carriages to slide forward to said workpiece, means for closing the first of said micro-switches when said tool carriages slide forward, said first switch closing a circuit from said source of potential to the first timed delay relay which, after a delay while said tools drive said screws, causes said tool carriages to be retracted, means for opening said first micro-switch, closing a second micro-switch, and also momentarily closing a third micro-switch as said tool carriages retract, said third micro-switch causing said indexing means to move forward, means for closing a fourth micro-switch as said indexing means moves forward which fourth switch closes a circuit from said source to a second timed delay relay which, after a delay, causes the tools to readvance and drive said other screws.

6. An automatic machine including means for holding a workpiece, a plurality of power driven tools each held in a sliding carriage, means for advancing said tools to a workpiece held in said holding means, said advancing means comprising electrically controlled pneumatic cylinders, means for causing said tools to operate on said workpiece, means for automatically retracting said tools, said retracting means also comprising said cylinders, means for automatically indexing said holding means and thereby aligning other parts of the workpiece with said tools, said indexing means comprising another electrically controlled pneumatic cylinder acting upon another sliding carriage on which is mounted said holding means, means for automatically readvancing said tools to the workpiece and again operating on said workpiece, means for automatically retracting said tools again and means for then retracting said holding means and stopping the machine.

7. An automatic screw driving machine including a carriage supporting a workpiece having a plurality of loosely held screws, a plurality of power-driven screwdrivers, an electrically controlled pneumatic cylinder for advancing and retracting each of said screwdrivers, an electrically controlled pneumatic cylinder for advancing and retracting said workpiece carriage, a series of electrical switches actuated by the movement of said screwdrivers and said carriage, circuits including said switches, means for starting said machine in operation by preparing said circuits, said circuits automatically causing said first cylinders to advance and retract said screwdrivers, to then cause said last cylinder to advance said carriage, to then cause said first cylinders to again advance and retract said screwdrivers, and to then cause said last cylinder to retract said carriage to starting position.

JACK R. TINSMAN.
RICHARD J. NOVY.
RICHARD O. PENCE.

References Cited in the file of this patent

UNITED STATES PATENTS

| Number | Name | Date |
|---|---|---|
| 304,065 | Beers | Aug. 26, 1884 |
| 409,225 | Otis | Aug. 20, 1889 |
| 611,811 | Harmby | Oct. 4, 1898 |
| 1,204,501 | Shipley | Nov. 14, 1916 |
| 1,536,423 | Clemens | May 5, 1925 |
| 1,683,815 | Brown et al. | Sept. 11, 1928 |
| 2,069,882 | Hall | Feb. 9, 1937 |
| 2,215,287 | Fox et al. | Sept. 17, 1940 |